United States Patent Office 3,370,930
Patented Feb. 27, 1968

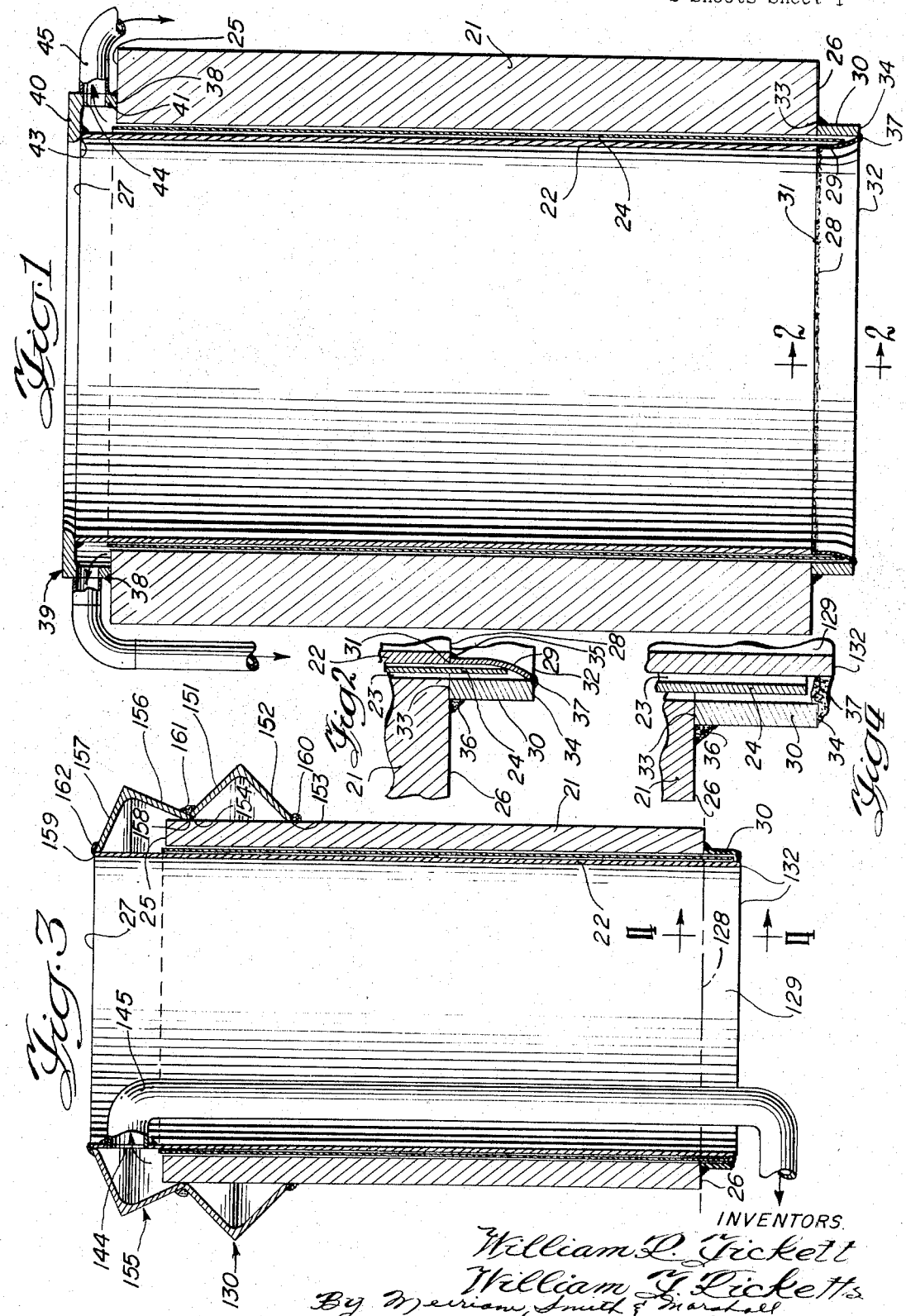

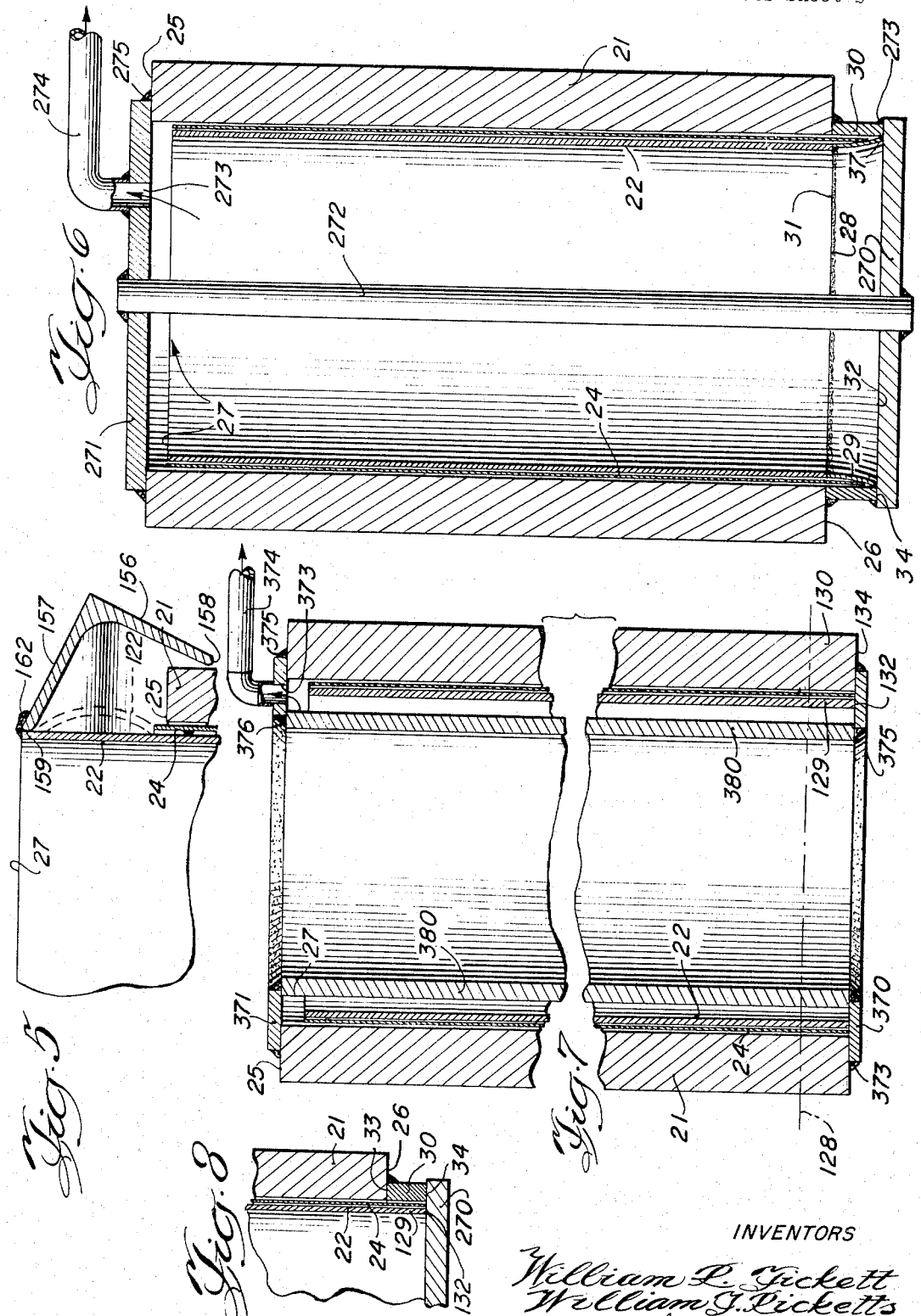

3,370,930
RING-CLADDING ASSEMBLY
William R. Fickett, Hinsdale, Ill., and William F. Ricketts, Birmingham, Ala., assignors to Chicago Bridge & Iron Company, Oak Brook, Ill., a corporation of Illinois
Filed Feb. 12, 1965, Ser. No. 432,202
15 Claims. (Cl. 29—191)

The present invention relates generally to an assembly for cladding an inner liner ring within an outer shell ring, and more particularly to an assembly for cladding large-diameter rings in a vertical disposition with the assembly including structural features which accommodate longitudinal vertical expansion on the part of the inner liner ring and which minimize radial stresses in the inner liner ring during the cladding operation.

Large clad rings are used in the construction of chemical reaction vessels, for example, and may be typically composed of a carbon steel outer shell ring clad on the inside with a stainless steel inner liner ring. The resulting clad ring has the economical advantages of carbon steel as well as the corrosion resistance features of stainless steel. A clad ring is superior to an unclad ring of the same thickness composed of either of the two materials utilized in the composite clad ring.

The production of large-idameter clad rings involves problems not existing in the production of small-diameter clad tubing or pipe, which may be produced using a convenient, horizontally disposed cladding assembly. Large-diameter rings are relatively heavy and have relatively thick side walls, compared to pipe or tubing, so that horizontally disposed large-diameter rings would lose their roundness if heated to the temperature required to effect the cladding of the inner liner to the outer shell.

Accordingly, it is necessary to produce large-diameter clad rings with the inner liner ring and outer shell ring arranged in vertically disposed concentric relation. This vertical arrangement produces problems with respect to longitudinal vertical expansion on the part of the inner liner ring relative to the outer shell ring, as well as problems with respect to radial stresses induced in the inner liner ring at locations remote from the opposite ends thereof.

The assembly of the present invention is intended to overcome these problems, as will be described subsequently in greater detail.

Other featutres and advantages are inherent in the structure claimed and disclosed or will become apparent to those skilled in the art from the following detailed description in conjunction with the accompanying diagrammatic drawings wherein:

FIGURE 1 is a vertical sectional view of an embodiment of a ring-cladding assembly constructed in accordance with the present invention;

FIGURE 2 is a fragmentary sectional view taken along line 2—2 in FIGURE 1;

FIGURE 3 is a vertical sectional view of another embodiment of ring-cladding assembly;

FIGURE 4 is a fragmentary sectional view taken along line 4—4 in FIGURE 3;

FIGURE 5 is an enlarged fragmentary sectional view of the top part of the assembly illustrated in FIGURE 3;

FIGURE 6 is a vertical sectional view of still another embodiment of a ring-cladding assembly;

FIGURE 7 is a vertical sectional view of a further embodiment of a ring-cladding assembly; and FIGURE 8 is a fragmentary sectional view of an additional embodiment of a ring-cladding assembly.

Referring initially to FIGURES 1 and 2, the embodiment illustrated therein includes a vertically disposed outer shell ring 21 having an upper end 25 and a lower end 26, and a vertically disposed inner liner ring 22, concentric within shell ring 21, and having an upper end 27 and a lower end 28. Shell ring 21 is typically composed of carbon steel and liner ring 22 is typically composed of stainless steel, a material having a coefficient of thermal expansion different than that of shell ring 21. Concentric rings 21, 22 are stationed apart and define an annular space 23 (FIG. 2) therebetween. The inner surface of shell 21 may be machined smooth to enhance bonding thereto of the inner liner during the cladding operation.

Located in annular space 23 is brazing material 24 for brazing the liner ring to the interior of the shell ring. The composition of the brazing material depends, of course, upon the compositions of the liner ring and the shell ring. Assuming that the outer shell was composed of ASTM type A387C carbon steel, and the inner liner was composed of type 347 stainless steel, the brazing may be 63.2 Ni, 25.7 Mn, 9.86 Cu and 1.21 Si, in weight percent.

The brazing material may be in the form of a thin metallic foil cylinder, or the brazing material may be flame sprayed or liquid sprayed onto liner ring 22. If the brazing material is foil, then, typically, the upper end of the brazing foil is "tacked" or spot welded to the liner ring at locations adjacent the upper ends of the foil cylinder and liner ring, and nowhere else. Tacking the brazing foil to the liner along the entire vertical dimension of the foil would cause wrinkles and tears in the foil and lead to unbonded areas between the liner and the shell following the cladding operation.

Located below lower end 28 of inner liner ring 22 is a short thin extension ring 29 constituting a continuation of liner ring 22 and composed of the same general material as liner ring 22 so as to have essentially the same coefficient of thermal expansion as the liner ring. For example, liner 22 may be type 347 stainless steel, and extension 29 may be type 304 stainless steel.

Referring to FIGURE 2, liner extension 29 has an upper end 31 sealingly welded to the lower end 28 of liner 22 at 35. Extension 29 also has an outwardly flared lower end 32 sealingly welded at 37 to the lower end 34 of a short, thin shell extension ring 30 having an upper end 33 sealingly welded at 36 to the lower end 26 of outer shell ring 21. The inner surface of shell extension 30 is vertically aligned with and constitutes an uninterrupted continuation of the inner surface of outer shell ring 21. Extensions 29 and 30, and their respective welds 35, 36 and 37 constitute a seal for annular space 23, at the lower end of the assembly.

Inner liner 22 is clad to the interior of outer shell 21 by heating the assembly in a furnace. The heat causes the inner liner 22 to expand, radially and longitudinally, until the outer surface of inner liner 22 presses against the interior surface of outer shell 21. The temperature of the furnace is one which causes the brazing to fuse and bond the inner liner to the outer shell. It is desirable that the cladding of the inner liner to the outer shell be uniform along a vertical dimension defined by the upper and lower ends 25, 26 of outer shell 21. It is also important that annular space 23 between inner liner ring 22 and outer shell ring 21 be sealed from the atmosphere so as to prevent oxidation of metallic brazing 24, among other things, during the cladding operation. It is for this last-mentioned purpose that the lower end 32 of liner extension 29 is sealingly welded at 37 to the lower end 34 of shell extension 30. However, the weld at 37 will induce radial stresses in the liner extension adjacent lower weld 37 during radial expansion.

On the other hand, if the lower limit of that part of inner liner 22 which is to be clad between the upper and lower ends 25, 26 of outer shell 21 is sufficiently remote from the bottom 32 of extension 29, the induced stresses in said part of liner 22 to-be-clad is negligible. Accordingly, liner extension 29 has an upper end 31 at least as low as the lower end 26 of shell ring 21 and a lower end 32 sufficiently below the upper end of extension 29 to eliminate induced radial stresses in liner ring 22 at locations along the entire vertical dimension between the lower and upper ends 25, 26 of outer shell 21. Typically, the inner liner should extend or have an extension below the lower end of the outer shell, of about 2 times the square root of R$t$, where R equals the outside radius of the inner liner and $t$ equals the thickness of the inner liner.

The assembly of FIGURE 1 also includes structure, at the upper end of the assembly, for accommodating longitudinal and radial expansion on the part of inner liner 22 relative to outer shell 21 during the cladding operation. More specifically, located atop upper end 25 of outer shell 21 is a ring-like metal pad 38 composed of plain carbon steel. Pad 38 would not be used if outer shell 21 is composed of plain carbon steel, but only if shell 21 is composed of steel requiring preheating for welding. The use of pad 38 eliminates the need to preheat the components of the assembly other than shell 21. Welded atop pad 38 is a top ring means, in the form of an angle iron or L-shaped in cross section, having a lower flange or wall portion 41 sealingly attached to the upper end 25 of outer shell 21 by the weldment at pad 38 and extending upwardly therefrom. Extending horizontally from flange 41 is another flange or wall portion 40 sealingly attached to the upper end portion of inner liner 22 (e.g., at the upper end 27 of liner 22) by weldment 43. Angle iron flanges or wall portions 40, 41 and the weldments at 43 and to pad 38 define a seal for annular space 23 at the upper end of the assembly.

Flange 41 of the top ring means includes an opening 44 which communicates with a conduit 45 in turn communicating with a vacuum pump (not shown) for evacuating annular space 23. Conduit 45 may also be used for introducing a controlled atmosphere into the annular space 23, if desired. As illustrated in FIGURE 1, more than one conduit 45 may be used in association with the top ring means defined by angle iron flanges 40, 41.

During the cladding operation, as inner liner 22 undergoes thermal expansion in both longitudinal and radial directions, this expansion is accommodated at the upper end of the assembly by flanges 40, 41 of the angle iron, which tend to open up or spread apart during the cladding operation.

Upper end 27 of inner liner 22 is located above upper end 25 of outer shell 21 to assure that there will be uniform or even cladding of liner 22 within shell 21 for at least that part of liner 22 which is located below upper end 25 of outer shell 21.

In the embodiment of FIGURE 1, the bottom extension 29 for inner liner 22 is composed of material which is substantially thinner and more flexible than liner 22. The thinness of liner extension 29 is such that the liner extension exceeds its elastic limit during the radial expansion which liner 22 and liner extension 29 undergo during the cladding operation. By providing a relatively flexible liner extension 29, as just described, the evenness of the cladding of relatively less flexible inner liner 22 to outer shell 21 is promoted, along the vertical dimension defined by the upper and lower ends 25, 26 of outer shell 21.

Lower shell extension 30 at the bottom of outer shell 21 provides a backing for that part of liner 22 and its extension 29 located below the lower end of outer shell 21 and also promotes evenness in the cladding of liner 22 to shell 21 along a vertical dimension defined by the upper and lower ends of shell 21.

In other embodiments of an assembly constructed in accordance with the present invention, it may not be necessary to construct the extensions for the inner liner and the outer shell of thinner material than the liner or shell respectively.

For example, in the embodiment of FIGURES 3-5, the extension of the lower end of liner 22 is merely an uninterrupted continuation 129 of liner 22. In this embodiment, it is desirable that that portion of the liner above dash-dot line 128 be clad to the outer shell 21. Dash-dot line 128 corresponds essentially to the lower end 26 of outer shell 21. The distance between dash-dot line 128 and the lower end 132 of inner liner extension 129 is a distance sufficient to minimize induced stresses in that part of liner 22 above line 128. However, in the embodiment of FIGURE 3, the thickness of inner liner extension 129 is the same as the thickness of inner liner 22. In substantially all other respects, the construction of the FIGURE 3 embodiment, at the lower end of the assembly, is the same as the embodiment of FIGURE 1.

Another difference between the embodiment of FIGURE 3 and that of FIGURE 1 is in the structure provided in the FIGURE 3 embodiment, at the upper end of the assembly, for accommodating vertical longitudinal and radial expansion on the part of inner liner 22 during the cladding operation.

More specifically, the top ring means of the embodiment of FIGURE 3 includes a first ring constructed of angle iron and having a lower flange 152 with a lower edge 153 sealingly attached by a weld 160 to the outer surface of outer shell 21 and an upper flange 151 with an upper edge 154 sealingly attached by a weld 161 to the lower edge 158 of a lower flange 156 of a second angle iron having an upper flange 157 with an upper edge 162 sealingly attached by a weld 163 to the upper end portion of inner liner 22 (e.g., at upper end 27 of inner liner 22).

Both the first and second angle iron rings are located on the outside of the shell ring and the liner ring, and the attachments of first angle iron upper edge 154 to second angle iron edge 158, at 161, is the only attachment for these two edges 154, 158. Therefore, the two angle iron rings are detached relative to the shell ring and the liner ring. The two angle iron rings provide an accordian-like expansion joint for inner liner 22 as the latter expands radially and longitudinally during the cladding operation.

Located in that portion of inner liner 22 above outer shell upper end 25 and below inner liner upper end 27 is an opening 144 with which a conduit 145 communicates for exhausting annular space 23 between inner liner 22 and outer shell 21. Conduit 145 may also be used, if desired, to introduce a controlled atmosphere into annular space 23.

During the cladding operation, the upper end portion of liner 22 (i.e., that portion between the upper end 25 of shell 21 and the upper end 27 of liner 22) assumes a deformed configuration illustrated by the dotted lines 122 in FIGURE 5.

Referring now to the embodiment of assembly illustrated in FIGURE 6, a significant distinction with respect to the previously described embodiments is that, instead of only the annular space between outer shell 21 and inner liner 22 being sealed from the atmosphere outside shell 21, all that portion of the assembly within outer shell 21 is sealed from the atmosphere outside shell 21.

Essentially, the structural arrangement at the bottom of the assembly of FIGURE 6 is the same as that at the bottom of the assembly of FIGURE 1 except that a bottom sealing plate 270 is provided, said plate 270 being welded to the bottom 34 of outer shell extension 30 at 273, around the outside periphery of the latter. In addition, in this embodiment, the weldment at 37 of lower end 32 of liner extension 29 to lower end 34 of outer shell extension 30 also effects a weldment to lower sealing plate 270.

Sealingly attached to the upper end 25 of outer shell 21, at a weldment 275 is an upper sealing plate 271 having an opening 273 communicating with a conduit 274 for evacuating all that part of the assembly within outer shell 21. If desired, conduit 274 may be used for introducing a controlled atmosphere within the interior of outer shell 25.

In the embodiment of FIGURE 6, upper end 27 of inner liner 22 is disposed below upper end 25 of outer shell 21 a distance equal to the amount of longitudinal vertical expansion inner liner 22 will undergo during the cladding operation. Thus, by providing a space between upper end 27 of inner liner 22 and the bottom of top sealing plate 271 (said bottom corresponding to upper end 25 of outer shell 21) means are provided for accommodating longitudinal expansion on the part of inner liner 22 relative to outer shell 21.

Because there are no attachments at the upper end of inner liner 22, there is nothing to obstruct radial expansion of inner liner 22 at locations adjacent the upper end thereof. Because of the arrangement at the bottom of inner liner 22 (i.e., liner extension 29 and associated structure), described in detail in connection with the description of the embodiment of FIGURE 1, there is nothing to impede the radial expansion of liner 22 at and above lower end 28 of liner 22, said lower end 28 being at essentially the same level as lower end 26 of outer shell 21. Thus, radial expansion of liner 22 along a vertical dimension defined by the upper and lower ends 25, 26 of outer shell 21 is essentially unimpeded.

A vertical rod 272 is welded at opposite ends to plates 270, 271 and is a brace for opposite sealing plates 270, 271 to prevent them from being collapsed inwardly toward each other when the space within outer shell 21 is evacuated through conduit 274.

The embodiment of FIGURE 7 is an assembly used when it is desired to clad the inner surface of outer shell 21 along a vertical dimension defined by the upper end 25 of shell 21 and a lower limit corresponding to dash-dot line 128. In this embodiment, inner liner 22 includes a lower extension 129 constituting an uninterrupted integral continuation of liner 22, as described in detail in connection with the embodiment of FIGURE 3. Moreover, in the embodiment of FIGURE 6, outer shell 21 includes a lower extension 130 constituting an uninterrupted integral continuation of outer shell 21, at the lower end thereof. Extension 130 on outer shell 21 corresponds in length to that of extension 129 on inner liner 22.

The seal at the bottom of the embodiment of FIGURE 7 is provided with a lower sealing ring 370 sealingly welded at 373 to the lower extension 130 of outer shell 121 and sealingly welded at 375 to the bottom end of an inner cylinder 380 having its upper end sealingly welded at 376 to the inner periphery of an upper sealing ring 371 having an outer periphery sealingly welded at 375 to the upper end 25 of outer shell 21. Upper sealing ring 371 includes an opening 373 which communicates with a conduit 374 for evacuating the space defined by inner cylinder 380, outer shell 21, lower sealing ring 370 and upper sealing ring 371. If desired, conduit 374 may be used to introduce a controlled atmosphere into the space described in the preceding sentence.

In the embodiment of FIGURE 7, the inner liner 22 is unattached with respect to any of the other elements of the assembly (with the possible exception of brazing 24, which, as previously described, may be composed of foil spot welded to the upper end of the inner liner 22). Accordingly, there is nothing to impede expansion of inner liner 22 in either radial or longitudinal direction. The distance between top end 27 of inner liner 22 and top end 25 of outer shell 21 corresponds to the longitudinal or vertical expansion which inner liner 22 will undergo during the cladding operation, and this can be computed by one skilled in the art by conventional computations as long as he knows the dimensions and compositions of the outer shell and the inner liner respectively.

In the embodiments of FIGURES 6 and 7, oxidation of inner liner 22, during heating, is prevented because there is no access thereto by the outside atmosphere.

FIGURE 8 illustrates the extension construction at the lower end of the assembly, of an additional embodiment; and the embodiment illustrated in FIGURE 8 incorporates some of the features of the embodiments of both FIGURES 6 and 7. More specifically, the lower extension 129 of liner 22 is the same as lower extension 129 in the embodiment of FIGURE 7, and the lower extension 30 for outer shell 21 is the same as the lower extension 30 in the embodiment of FIGURE 6. The lower sealing plate 270, in FIGURE 8, is the same as the lower sealing plate 270 in FIGURE 6; but it may also be a ring like 370 in FIGURE 7.

In the embodiments of FIGURES 1 and 6, the lower extension 29 for inner liner 22 is flared outwardly at its bottom end 32. This facilitates a sealed attachment of liner extension bottom end 32 to the bottom end 34 of shell extension 30. The flared bottom ends could also be used in the embodiment of FIGURE 8 whether the lower sealing element is a plate 270 or a ring like 370 in FIGURE 6.

Referring to the embodiments of FIGURES 1 and 3, the liner ring 22 has an upper end portion vertical dimension, measured between the upper end 25 of outer shell 21 and the attachment of liner 22 to the second wall portion of the top ring means (e.g., at 43 in FIGURE 1 and at 162 in FIGURE 3), which is at least that distance required to eliminate induced radial stress in the liner ring below the upper end 25 of the outer shell 21 during the cladding operation.

The angle irons in FIGURES 1 and 3, the sealing plates 270, 271 in FIGURE 6 and the sealing rings 370, 371 in FIGURE 7 may be composed of carbon steel.

The foregoing detailed description has been given for clearness of understanding only, and no unnecessary limitations should be understood therefrom, as modifications will be obvious to those skilled in the art.

What is claimed is:
1. A ring cladding assembly comprising:
a vertically disposed outer shell ring having an upper end and a lower end;
a vertically disposed inner liner ring, concentric within said shell ring, and having an upper end and a lower end;
said liner ring having a coefficient of thermal expansion different than that of the shell ring;
said rings being spaced apart and defining an annular space therebetween;
brazing material, between said rings, for brazing the liner ring to the interior of the shell ring;
means for sealing said annular space from the atmosphere outside said shell ring;
means at the upper end of said assembly for accommodating longitudinal vertical expansion of the liner ring relative to the shell ring;
and means at both upper and lower ends of the assembly for permitting unrestrained radial expansion of the liner ring along a vertical dimension defined by the opposite ends of said shell ring.
2. An assembly as recited in claim 1 wherein said radial expansion-permitting means at the lower end of the assembly comprises:
an extension at the bottom end of said liner ring and constituting a continuation of the latter;
said extension having the same coefficient of thermal expansion as said liner ring;
said extension having an upper end at least as low as the lower end of said shell ring and a lower end sufficiently below the upper end of the extension to eliminate induced radial stress in the liner ring at and above the lower end of the shell ring during the cladding operation.
3. An assembly as recited in claim 2 wherein said liner ring extension is substantially thinner than said liner ring, and the thinness of said extension is such as to enable the extension to exceed its elastic limit during the cladding operation.

4. An assembly as recited in claim 2 and comprising:
an extension at the bottom end of the shell ring and constituting a continuation of the latter;
said shell ring extension having the same coefficient of expansion as the shell ring and having an inner surface vertically aligned with and constituting an uninterrupted continuation of the inner surface of the shell ring;
said shell ring extension having a lower end disposed below the lower end of the shell ring a distance equal to at least the greater part of the distance at which the lower end of the liner ring extension extends below the upper end of the liner ring extension.

5. An assembly as recited in claim 4 wherein said shell ring extension is substantially thinner than said shell ring.

6. An assembly as recited in claim 4 wherein:
said liner ring extension is flared outwardly at the lower end thereof;
and the lower ends of both of said extensions are sealingly attached to define a seal for the annular space at the lower end of the assembly.

7. A ring cladding assembly comprising:
a vertically disposed outer shell ring having an upper end and a lower end;
a vertically disposed inner liner ring, concentric within said shell ring, and having an upper end and a lower end;
said liner ring having a coefficient of thermal expansion different than that of the shell ring;
said rings being spaced apart and defining an annular space therebetween;
brazing material, between said rings, for brazing the liner ring to the interior of the shell ring;
a first extension ring, substantially thinner than and having the same coefficient of thermal expansion as said shell ring, sealingly attached to the lower end of the shell ring;
said first extension ring having an inner surface vertically aligned with and constituting an uninterrupted continuation of the inner surface of the shell ring;
a second extension ring, substantially thinner than and having the same coefficient of thermal expansion as said liner ring, sealingly attached to the lower end of the liner ring;
each of said extension rings having upper and lower ends;
means sealingly attaching the lower ends of said two extension rings together;
said extension rings and said attaching means constituting a seal for said annular space, at the lower end of the assembly;
and means, at the upper end of the assembly, sealing said annular space at the assembly's upper end and including means for accommodating longitudinal vertical expansion of the liner ring relative to the shell ring and means for permitting unrestrained radial expansion of the liner ring below and at least up to the upper end of the shell ring.

8. An assembly as recited in claim 7 wherein:
said last-recited means comprises ring means at the top of said assembly;
and the upper end of the liner ring extends above the upper end of the shell ring;
said top ring means including an upwardly extending first wall portion having a lower end sealingly attached to the upper end portion of the shell ring and a second wall portion extending angularly from said first wall portion and sealingly attached to the upper end portion of the liner ring at a location above the upper end of the shell ring;
said top ring means including means defining a seal for the annular space, at the upper end of the assembly, and means for accommodating longitudinal expansion of the liner ring in an upward direction.

9. An assembly as recited in claim 8 wherein said top ring means has an L-shaped cross-section.

10. An assembly as recited in claim 8 wherein said top ring means comprises:
a first ring, constructed of angle iron, and having a lower flange edge attached to the upper end portion of the shell ring on the outside of the shell ring;
a second ring, constructed of angle iron, and having a lower flange edge attached to the upper flange edge of said first angle iron ring and an upper flange edge attached to the upper end portion of the liner ring;
both of said angle iron rings being located on the outside of said shell ring and said liner ring;
said upper flange edge on the first angle iron ring and said lower flange edge of the second angle iron ring being detached relative to the shell ring and the liner ring.

11. An assembly as recited in claim 8 wherein:
the vertical dimension of the liner ring's upper end portion, measured between the upper end of the shell ring and the attachment of the liner ring to the second wall portion of the top ring means is at least that distance required to eliminate induced radial stress in the liner ring below the upper end of the shell ring during the cladding operation.

12. An assembly as recited in claim 7 wherein:
said brazing material is a metallic foil cylinder surrounding said inner liner ring;
said foil cylinder being spot-welded to the inner liner around the periphery of the latter at locations consisting of the upper end portions of the foil cylinder and inner liner.

13. An assembly as recited in claim 7 wherein the inner surface of the outer shell is relatively smooth, compared to the outer surface of the shell, to facilitate bonding of the inner liner to the outer shell.

14. An assembly as recited in claim 7 and comprising means for evacuating said annular space.

15. An assembly as recited in claim 7 wherein said liner ring has a coefficient of thermal expansion greater than that of the shell ring.

References Cited
UNITED STATES PATENTS

| | | | |
|---|---|---|---|
| 3,136,610 | 6/1964 | Goto | 29—191 |
| 3,148,953 | 9/1964 | Goto | 29—191 |
| 3,313,604 | 4/1967 | Crouch | 29—191 |

DAVID L. RECK, *Primary Examiner.*

RICHARD O. DEAN, *Examiner.*